US007110741B2

(12) United States Patent
Knopik et al.

(10) Patent No.: US 7,110,741 B2
(45) Date of Patent: Sep. 19, 2006

(54) RADIOFREQUENCY UNIT

(75) Inventors: Vincent Knopik, Saint Nazaire les Eymes (FR); Didier Belot, Rives (FR)

(73) Assignee: STMicroelectronics, S.A., (FR)

( * ) Notice: Subject to any disclaimer, the term of this patent is extended or adjusted under 35 U.S.C. 154(b) by 460 days.

(21) Appl. No.: 10/722,245

(22) Filed: Nov. 25, 2003

(65) Prior Publication Data

US 2004/0113844 A1 Jun. 17, 2004

(30) Foreign Application Priority Data

Nov. 27, 2002 (FR) .................................. 02 14905

(51) Int. Cl.
*H04B 1/28* (2006.01)

(52) U.S. Cl. ................ 455/333; 455/121; 343/700 MS

(58) Field of Classification Search ................ 455/121, 455/333, 323, 120, 91, 41.2, 82, 107, 129, 455/193.1, 575.7; 333/247; 343/700 MS, 343/702, 846

See application file for complete search history.

(56) References Cited

U.S. PATENT DOCUMENTS 5,400,039 A * 3/1995 Araki et al. ......... 343/700 MS
5,404,581 A * 4/1995 Honjo ........................ 455/90.1
5,903,239 A * 5/1999 Takahashi et al. ... 343/700 MS
6,181,278 B1 * 1/2001 Kakimoto et al. ... 343/700 MS
6,320,547 B1 * 11/2001 Fathy et al. ......... 343/700 MS
6,388,623 B1 * 5/2002 Sakota et al. ........ 343/700 MS

FOREIGN PATENT DOCUMENTS

EP 0866517 A2 9/1998
FR 0627765 12/1994

OTHER PUBLICATIONS

Kim, Juno, et al., A Novel Broadband Flip Chip Interconnection, ISBN: 0-7803-4203-8, 1997.

* cited by examiner

*Primary Examiner*—Sonny Trinh
(74) *Attorney, Agent, or Firm*—Lisa K. Jorgenson; Graybeal Jackson Haley; Paul F. Rusyn

(57) ABSTRACT

A radiofrequency unit comprising a first dielectric substrate supporting a first conductive antenna layer; a second dielectric substrate supporting circuit elements connected or coupled to ground formed in a second conductive layer, and comprising a radiofrequency antenna line; and a third screen conductive layer arranged between the first and second substrates, provided with a slot to couple the antenna line to the antenna layer, this conductive layer being floating; in which the thickness and the nature of the second substrate are chosen by taking into account the surface of said circuit elements for the screen layer to be coupled to ground by a capacitor forming a short-circuit for radiofrequencies.

17 Claims, 1 Drawing Sheet

A-A

B-B

RADIOFREQUENCY UNIT

PRIORITY CLAIM

This application claims priority from French patent application No. 02/14905, filed Nov. 27, 2002, which is incorporated herein by reference.

BACKGROUND

1. Technical Field

The present invention generally relates to a radiofrequency communication unit, and in particular a radiofrequency communication unit for replacing a cable link between two electronic devices with a radio link when the distance is small between the two devices.

2. Discussion of the Related Art

Such a communication unit, of a range of a few meters, exchanges radiofrequency signals (having a frequency ranging between 1.8 and 10 GHz) by means of a small flat antenna, generally called in the art a patch antenna, coupled to a radiofrequency signal processing chip. Input/output pads of the unit enable the chip to exchange so-called “low frequency” signals (having a frequency ranging between 10 kHz and 10 MHz) with a device in which the unit is integrated.

FIG. 1 schematically shows a cross-sectional side view of a radiofrequency communication unit 2, comprised of a stratified substrate 4 formed of two dielectric substrates 6 and 8 arranged on either side of a conductive screen layer 10. A conductive layer 12 forming a patch antenna is printed on the upper surface of substrate 6. The lower surface of substrate 8 supports a printed radiofrequency antenna line 16 connected to a terminal 18 of a chip 20 intended to transmit or receive radiofrequency signals. Radiofrequency line 16 is coupled to antenna layer 12 by a coupling slot 22 made in the screen layer 10 perpendicularly to line 16. The lower surface of substrate 8 also supports printed tracks 24 which define a plurality of input/output pads (I/O) of the unit and their connection to terminals 26 (a single one of which is shown) of chip 20. Each of the input/output pads is formed of a metallized surface where a connection ball (or welding ball) is placed. At least one of the pads is provided to be connected to ground and at least another one is provided to be connected to a supply terminal of the unit; the other pads are provided to transmit low-frequency signals between chip 20 and the outside of the unit. At least one via 28 made in substrate 8 connects screen layer 10 to a grounded pad.

Coupling slot 22 is made in screen layer 10 vertically above a portion O of antenna line 16. Upon transmission, the radiation of portion O is captured by the antenna 12 which retransmits it. Upon reception, the unit operates symmetrically.

Such a unit operates satisfactorily, but a problem results from the fact that the welding balls arranged on the I/O pads, which enable a simple assembly with a low bulk, have a height limited to approximately 0.5 mm. This imposes assembling chip 20 head-to-tail directly on tracks 24 printed under substrate 8. Now, such an assembly imposes that the chip 20 and the substrate 8 have substantially identical thermal expansion coefficients to avoid occurrence of mechanical constraints likely to result in a tearing of the chip terminals. Thus, in the conventional case of a silicon chip 20, substrate 8 must preferably be made of glass. A glass substrate being very difficult to bore, the forming of via 28 requires great precautions. Further, glass is poorly wettable and the filling of via 28 with a conductive material is also difficult. All this substantially increases the unit manufacturing cost. It is, however, necessary for the voltage of the screen layer not to be left floating, since screen layer 10 captures the undesirable radiation of line 16 towards antenna 12 and the radiation of antenna 12 towards the inside of the unit. The voltage of screen layer 10, if it was left floating, would vary under the effect of the captured radiation and screen layer 10 would radiate in the radiofrequency field. Such a radiation would disturb the operation of antenna 12 and that of chip 20, which is not desirable.

A solution consists of replacing via 28 through substrate 8 by an external conductive track located on an edge of the substrate. However, the manufacturing of an external track remains difficult and expensive.

SUMMARY

One aspect of the present invention is to provide a radiofrequency unit which is inexpensive to manufacture Another aspect of the present invention is to provide such a radiofrequency unit which is robust.

Another aspect of the present invention provides a radiofrequency unit comprising: a first dielectric substrate on the upper substrate of which is arranged a first conductive antenna layer; a second dielectric substrate on the lower surface of which are arranged circuit elements comprising a chip connected to input/output pads of the unit by portions of a second conductive layer, and comprising a radiofrequency antenna line connected to the chip; and a third screen conductive layer arranged between the first and second substrates, provided with a slot to couple the antenna line to the antenna layer, this conductive layer being floating; in which the areas of the lower surface of the second dielectric substrate on which are not arranged the circuit elements are covered with grounded portions of the second conductive layer, one at least of the pads being grounded and each of the other pads being connected to ground by a capacitor forming a short-circuit for radiofrequencies; the thickness and the nature of the second substrate being chosen by taking into account the surface of said portions and of said pads for the screen layer to be coupled to ground by a capacitor forming a short-circuit for radiofrequencies.

According to an embodiment of the present invention, one of the circuit elements is an inductance formed in the second conductive layer.

According to an embodiment of the present invention, one of the circuit elements is a capacitor formed of two interleaved comb-shaped conductive surfaces formed in the second conductive layer.

According to an embodiment of the present invention, welding balls are arranged on the input/output pads.

An aspect of the present invention goes against the prevailing idea according to which the screen layer must be physically connected to ground so that its voltage is not left floating in the radiofrequency field. One aspect of the present invention provides a radiofrequency unit having its screen layer connected to ground only by means forming a short-circuit for radiofrequencies.

The foregoing, features and advantages of the present invention will be discussed in detail in the following non-limiting description of specific embodiments in connection with the accompanying drawings.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
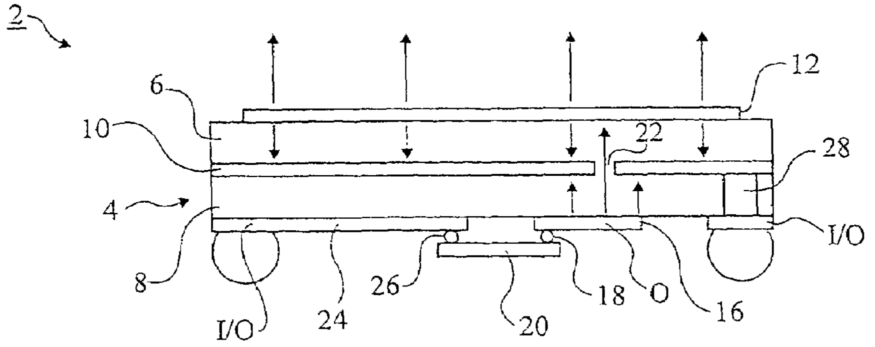
Fig 1 (Background Art)
FIG. 1, previously described, schematically shows a side cross-section view of a conventional radiofrequency unit.

Same reference numerals designate same elements in FIG. 1 and in the following drawings. Only those elements necessary to the understanding of the present invention have been shown hereafter.

Figure 2:
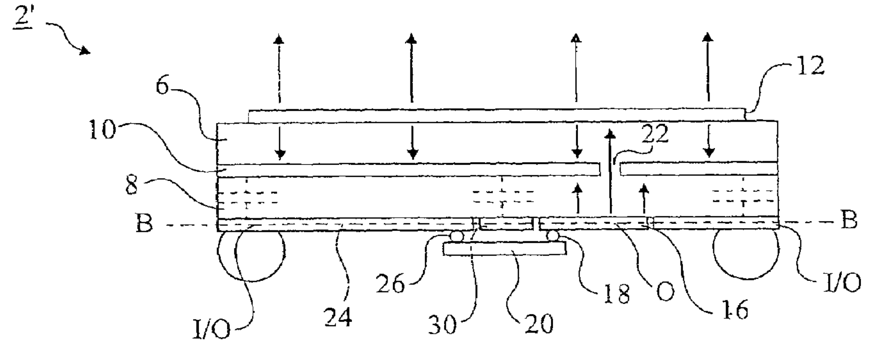
FIG. 2 shows a side cross-section view of a radiofrequency unit according to an embodiment of the present invention.
Figure 3:
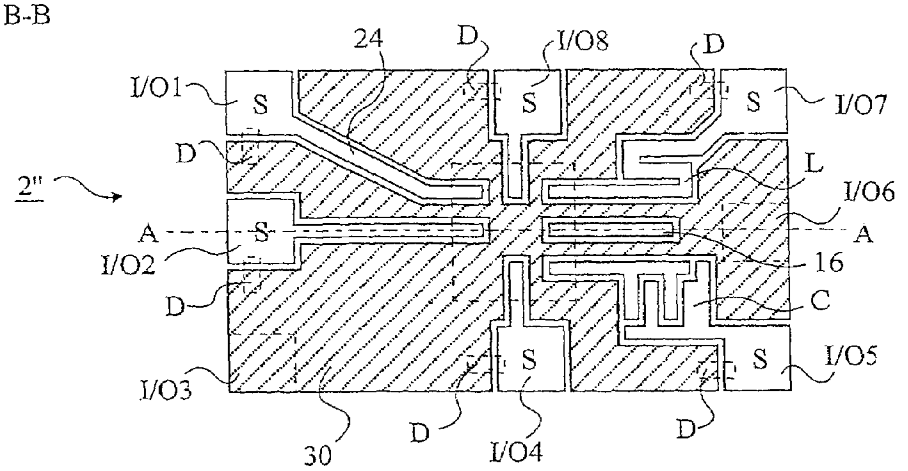
FIG. 3 shows a bottom cross-section view of the radiofrequency unit of FIG. 2.

FIGS. 2 and 3 schematically respectively show a cross-section side view along an axis A—A and a cross-section bottom view along an axis B—B of a radiofrequency communication unit 2' according to an embodiment of the present invention. Unit 2' comprises the same elements as unit 2 of FIG. 1, excluding via 28. As an illustration, unit 2' comprises eight pads I/O1 to I/O8. Pads I/O1, I/O2, I/O4, and I/O8 are directly connected to a terminal of chip 20 by a track 24; pad I/O5 is connected to a pad of chip 20 via a capacitor C formed of two interleaved comb-shaped surfaces; and pad I/O7 is connected to a pad of chip 20 via an inductance L formed by a conductive line of predetermined length printed in zigzag. Pads I/O3 and I/O6, connected to an external ground not shown, are connected to a ground terminal of chip 20 by a ground conductive plane 30. Ground plane 30 is further arranged on substantially the entire lower surface of substrate 8 left free by tracks 24 and line 16.

According to an embodiment of the present invention, screen layer 10 is not physically connected to any conductive element of unit 2'. The present invention however provides connecting screen layer 10 to ground in the radiofrequency field by a plurality of capacitors formed between the screen layer and conductive surfaces arranged on the lower surface of the unit.

Ground plane 30, separated from screen layer 10 by dielectric substrate 8, forms therewith a coupling capacitor, the value of which depends on the surface area of plane 30, on the thickness of substrate 8, and on the dielectric constant of substrate 8 (for example, of glass).

Further, each I/O pad not directly grounded is connected to ground by a discrete capacitor D adapted to forming, in practice, a short-circuit for radiofrequencies. On the other hand, the metal surface S of each I/O pad, which is separated from screen layer 10 by dielectric substrate 8, forms a capacitor coupling screen layer 10 to the pad. The value of pad/screen capacitance 10 depends on surface area S of the pad and on the thickness and on the dielectric constant of substrate 8. Screen layer 10 thus is, at the level of each pad, also coupled to ground by the series connection of capacitor D with the pad/screen capacitor. In practice, the value of capacitor D may easily be higher than the value of pad/screen capacitor 10 and the series connection of these two capacitors substantially corresponds to a coupling of screen layer 10 to ground by a capacitor having the value of the pad/screen capacitor. Such a coupling is formed in parallel at the level of each of the I/O pads of the unit not connected to ground. These couplings add up and are equivalent to a coupling of layer 10 to ground by a capacitor having n times the value of a pad/screen capacitor, where n is the number of I/O pads of the unit not connected to ground. This capacitor adds to the ground plane/previous screen capacitor.

This embodiment of the present invention provides choosing the thickness of substrate 8, the surface area of ground plane 30, as well as the surface area of the I/O pads so that the ground plane/screen capacitor and the pad/screen capacitors have values such that these capacitors form a short-circuit in the radiofrequency field.

No account has been taken in the foregoing description of capacitors formed between the low-frequency passive electronic components printed on the lower surface of substrate 8 and the screen layer (for example, capacitor C or inductance L of FIG. 3), but such capacitors advantageously cooperate to the coupling of the screen layer to ground in the radiofrequency field according to this embodiment of the present invention.

As an example if the surface area of each I/O pad is 0.5 mm by 0.5 mm and if substrate 8 has a 0.2-mm thickness and a 4.10-11-F/m dielectric constant, each pad/screen capacitor has a value of 50 fF. If each coupling capacitor D between pad and ground has a 100-pF value, the assembling in series of the 50-fF capacitor and of the 100-pF capacitor corresponds approximately to the connection of a 50-fF capacitor between the screen layer and the ground. If the radiofrequency unit comprises 20 pads not connected to ground, the screen layer is connected to ground by 20 capacitors of 50 fF connected in parallel, which amounts to the connection of a capacitor of approximately 1 pF between the screen layer and the ground. The ground plane surface area being generally at least equal to that of all pads together, the value of the capacitance between the screen plane and the ground is in practice at least twice the above-mentioned value.

Due to the ground coupling of screen layer 10 of radiofrequency unit 2', the voltage of screen layer 10 does not vary under the influence of undesirable radiofrequency radiations of line 16 or of the radiation of antenna 12 towards the inside of the unit. As a result, screen layer 10 scarcely radiates in the radiofrequency field although it is not physically grounded.

A radiofrequency unit according to this embodiment of the present invention, requiring no forming of a via or of a conductive track between the screen layer and another portion of the unit, is particularly inexpensive to manufacture and robust.

An embodiment of the present invention has been described in relation with a radiofrequency unit comprising for clarity a restricted number of circuit elements, but those skilled in the art will easily adapt the present invention to any unit comprising a larger number of circuit elements, for example, two chips or two antenna lines for two different radio frequencies.

The radiofrequency unit 2' may be contained in a varity of different types of electronic systems utilizing wireless communications, such as a computer system or personal digital assistant.

Of course, the present invention is likely to have various alterations, modifications, and improvements which will readily occur to those skilled in the art. In particular, the present invention has been described in relation with a specific radiofrequency unit type, but those skilled in the art will easily adapt the present invention to other radiofrequency or ultrahigh frequency unit types in which it may be advantageous to suppress a physical connection between the ground and a screen layer.

The present invention has been described in relation with a unit using glass substrates supporting a silicon chip, but those skilled in the art will easily adapt the present invention to other types of substrates supporting one or several chips made of another material.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A radiofrequency unit comprising:

a first dielectric substrate on the upper substrate of which is arranged a first conductive antenna layer;

a second dielectric substrate on the lower surface of which are arranged circuit elements comprising a chip connected to input/output pads of the unit by portions of a second conductive layer, and comprising a radiofrequency antenna line connected to the chip; and a third screen conductive layer arranged between the first and second substrates, provided with a slot to couple the antenna line to the antenna layer, this conductive layer being floating;

in which the areas of the lower surface of the second dielectric substrate on which are not arranged the circuit elements are covered with grounded portions of the second conductive layer, one at least of the pads being connected to ground and each of the other pads being grounded by a capacitor forming a short-circuit for radiofrequencies; the thickness and the nature of the second substrate being chosen by taking into account the surface of said portions and of said pads for the screen layer to be coupled to ground by a capacitor forming a short-circuit for radiofrequencies.

2. The radiofrequency unit of claim 1, wherein one of the circuit elements is an inductance formed in the second conductive layer.

3. The radiofrequency unit of claim 1, wherein one of the circuit elements is a capacitor formed of two interleaved comb-shaped conductive surfaces formed in the second conductive layer.

4. The radiofrequency unit of claim 1, wherein welding balls are arranged on the input/output pads.

5. An antenna structure including a substrate structure, the antenna structure comprising:

a first antenna layer formed on a first surface of the substrate structure;

a second antenna layer formed on a second surface of the substrate structure;

a first conductive layer formed between the first and second antenna layers and including an opening formed in the first conductive layer adjacent the second antenna layer;

a second conductive layer formed on a third surface of the substrate structure, the second conductive layer being adapted to be coupled to a reference voltage source; and first conductive segments formed on a fourth surface of the substrate structure, the first conductive portions being positioned relative to the second conductive layer to form respective first capacitors between each segment and the second conductive layer, and the first conductive segments being positioned relative to the first conductive layer to form respective second capacitors between each segment and the first conductive layer, each of the first and second capacitors having a relatively small impedance at an operating frequency of the antenna structure.

6. The antenna structure of claim 5 wherein the opening in the first conductive layer comprises a slot.

7. The antenna structure of claim 5 wherein the third and fourth surfaces of the substrate comprise the same surface.

8. The antenna structure of claim 7 wherein the substrate structure comprises:

a first dielectric substrate having a first surface adjoining the first antenna layer and a second surface adjoining the first conductive layer; and a second dielectric substrate having a first surface adjoining the first conductive layer and a second surface corresponding to the third and fourth surfaces.

9. The antenna structure of claim 8 further comprising a communications chip coupled to the conductive segments and the second antenna layer.

10. An electronic system including a wireless communications unit, the communications unit comprising:

an antenna structure including a substrate structure, the antenna structure including, a first antenna layer formed on a first surface of the substrate structure;

a second antenna layer formed on a second surface of the substrate structure;

a first conductive layer formed between the first and second antenna layers and including an opening formed in the first conductive layer adjacent the second antenna layer, a second conductive layer formed on a third surface of the substrate structure, the second conductive layer being adapted to be coupled to a reference voltage source; and first conductive segments formed on a fourth surface of the substrate structure, the first conductive portions being positioned relative to the second conductive layer to form respective first capacitors between each segment and the second conductive layer, and the first conductive segments being positioned relative to the first conductive layer to form respective second capacitors between each segment and the first conductive layer, each of the first and second capacitors having a relatively small impedance at an operating frequency of the antenna structure; and a communications chip coupled to the conductive segments and the second antenna layer.

11. The electronic system of claim 10 wherein the system comprises a computer system.

12. The electronic system of claim 10 wherein operating frequency comprises a frequency in the range of approximately 1.8 GHz to 10 GHz.

13. A method of transmitting electromagnetic signals, the method comprising:

forming a first antenna structure;

forming a second antenna structure;

forming a conductive structure between the first and second antenna structures, the conductive structure including an opening adjacent the second antenna structure and being electrically isolated from the first and second antenna structures at direct voltages and currents;

applying electric signals to the second antenna structure that cause the second antenna structure to generate first electromagnetic signals that propagate through the opening in the conductive structure, the first electromagnetic signals having a frequency;

transmitting second electromagnetic signals from the first antenna structure responsive to the first electromagnetic signals propagating through the opening; and capacitively coupling the conductive structure to a reference voltage for signals incident on the conductive structure having the frequency.

14. The method of claim 13 wherein capacitively coupling the conductive structure to a reference voltage for signals having the frequency comprises:

forming a reference structure adjacent the conductive structure; and forming a dielectric structure between the reference and conductive structures.

15. The method of claim 14 wherein forming a reference structure adjacent the conductive structure comprises:

forming a conductive reference plane; and forming a plurality of signal pads.

16. The method of claim 15 wherein each of the signal pads has an area and wherein the dielectric has a dielectric constant, and wherein the dielectric constant and areas of the signal pads are selected to form capacitors having relatively low impedances at the frequency between each signal pad and the conductive structure, and to form capacitors having relatively low impedances at the frequency between each signal pad and the conductive reference plane.

17. The method of claim 16 wherein each of pads has an approximately square shape, with the lengths of the sides being chosen to provide the desired area for each pad.

* * * * *